United States Patent [19]

Schmidt

[11] Patent Number: 4,718,883

[45] Date of Patent: Jan. 12, 1988

[54] PROCESS FOR MANUFACTURING ARTICLES OF FILTER PAPER

[75] Inventor: Heinrich Schmidt, Porta Westfalica, Fed. Rep. of Germany

[73] Assignee: Melitta-Werke Bentz & Sohn, Minden, Fed. Rep. of Germany

[21] Appl. No.: 861,819

[22] Filed: Jan. 17, 1986

Related U.S. Application Data

[63] Continuation-in-part of Ser. No. 788,736, Oct. 17, 1985, abandoned.

[30] Foreign Application Priority Data

Oct. 18, 1984 [DE] Fed. Rep. of Germany ....... 3438213

[51] Int. Cl.$^4$ .......................... B31B 1/60; B31B 1/74; B31B 1/88; B05D 3/12
[52] U.S. Cl. ..................................... 493/328; 427/244; 427/275; 427/285; 493/394; 493/395; 493/464; 493/941
[58] Field of Search ............... 493/328, 329, 941, 394, 493/395, 464; 427/285, 244, 275

[56] References Cited

U.S. PATENT DOCUMENTS 3,444,791  5/1969  Honsel ........................... 493/941 X
3,479,203  11/1969  Broadhurst ........................ 427/285

FOREIGN PATENT DOCUMENTS 0000448  1/1979  European Pat. Off. .
3034955  3/1982  Fed. Rep. of Germany .
3046036  7/1982  Fed. Rep. of Germany .

OTHER PUBLICATIONS

Hawley, G. G., *The Condensed Chemical Dictionary*, New York, Van Nostrand Reinhold Company, 1977, p. 239.

*Primary Examiner*—Evan K. Lawrence
*Attorney, Agent, or Firm*—Spencer & Frank

[57] ABSTRACT

A process for manufacturing articles of filter paper in which the wet strength of the regions of weak points resulting from mechanical working is increased by the application of a wet strengthener of cross-linked cationic polyalkylenimines. For this purpose, the wet strengthener is applied only to the regions of the weak points after the filter paper has been manufactured. Seams or edge reinforcements are formed by relief printing before the application of the wet strengthener and a heat treatment takes place after application of the thermoplastic wet strengthener to cause the wet strengthener to harden. The application of the wet strengthener is effected in measured doses so that the legally prescribed maximum amounts to be added are not exceeded.

3 Claims, 3 Drawing Figures

PROCESS FOR MANUFACTURING ARTICLES OF FILTER PAPER

This is a continuation-in-part of application Ser. No. 788,736, filed Oct. 17, 1985, now abandoned.

BACKGROUND OF THE INVENTION

The present invention relates to a process for manufacturing articles of filter paper, the process including the formation of weak points as a result of mechanical working, and strengthening the paper with the aid of a wet-strength increasing agent (wet strengthener) of cross-linked cationic polyalkylenimines.

In the past, these articles have been manufactured by adding the wet strengthener in the pulping engine as well as in the mixing tub during the production of the filter paper so as to increase the wet strength of the material.

With this manner of proceeding, the wet strength can be increased, with the maximum permissible dosage, by about 30 to 35% compared to untreated filter paper. Addition of more strengthener does not result in significant increases in wet strength, but adversely influences the filtrability of the paper.

Depending on the shape of the articles made of the filter paper, mechanical working produces weak points in the paper, e.g. the knurling on filter paper inserts by relief printing or the edge region reinforcement and perforation of filter paper panels. The high stamping pressure applied then results not only in excessive wear of the stamping tool but particularly also in considerable crushing of the seam area and thus in the formation of considerable amounts of weak points.

SUMMARY OF THE INVENTION

It is an object of the present invention to provide a process of the specified type with which the wet strength in the region of the weak points can be increased substantially, the amount of paper used and the wear of the stamping tool can be reduced.

The above and other objects are accomplished, according to the present invention, in that, after the paper article has been manufactured, wet strengthener is applied only to the regions of the weak points.

It has been found, very surprisingly, that a two to three fold superproportional increase in wet strength can be realized in the region of the weak points. The increase is superproportional in that the proportionate increase in wet strength is markedly greater than the proportionate increase in the concentration of wet strengthener in the region of the weak points.

The legally prescribed dosaging levels in the end product are not exceeded by the application of the wet strengthener. According to the rules for hot filters, the content of wet-strength increasing agents must be limited to no more than 0.5% with reference to the dry fiber material of the commercially traded goods. According to past experiences, the surprising increase in wet strength resulting from the invention, which increase cannot be attained by adding any amount of wet strengthener during manufacture of the filter paper, is a result of the fact that the wet strengthener attaches itself to the fibers of the filter paper and thus forms a substantially water repelling protection and prevents dissolution of the fiber-to-fiber bond when wet, even in the presence of high temperatures, e.g. for brewed beverages.

Since a paper filter will in virtually all cases tear, or at least begin to tear, in a weakened region when the filter is wet, an increase in the wet strength of the paper in the region or regions of all weak points makes it possible to utilize filter paper having a substantially lower weight per unit area than the paper previously used while providing the requisite resistance to tearing. A reduction in the weight of paper per unit area makes possible a corresponding reduction in the required stamping pressure. Thus, it is possible to reduce the amount of paper used by reducing the weight per surface area and also to operate with a lower stamping pressure.

This, on the one hand, reduces wear of the tools and, on the other hand, since the relief printing process, or stamping pressure, is not as strong, the filter paper fibers are stressed less and the wet strength is, as a result, additionally increased.

Typical practical embodiments of the invention will permit use of paper having a weight per unit surface area as low as 20% of that previously employed, and the required stamping pressure will correspondingly be 20% of that previously employed.

Application of the wet strengthener can be effected with structurally simple means. For example, an applicator in the form of an intaglio cylinder may be one unit of a follow-on tool which is associated with a stamping tool constituting a further unit.

Following stamping and application of the wet strengthener, the filter paper article is subjected to a heat treatment. This may be effected, for example, by means of microwaves or high frequency heating. This causes the wet strengthener, which has thermoplastic properties when applied, to be hardened.

It is possible, on the one hand, to additionally apply the wet strengthener over the regions of the weak points on a filter paper article which had already been provided with a wet strengthener during manufacture of the filter paper. Or the wet strengthener may be applied onto the regions of the weak points on a filter paper article which had not been provided with a wet strengthener during the manufacture of the filter paper.

Embodiments of articles made of filter paper, produced according to the process of the present invention, will be described below with reference to the attached drawings.

DESCRIPTION OF THE PREFERRED EMBODIMENTS

Figure 1:
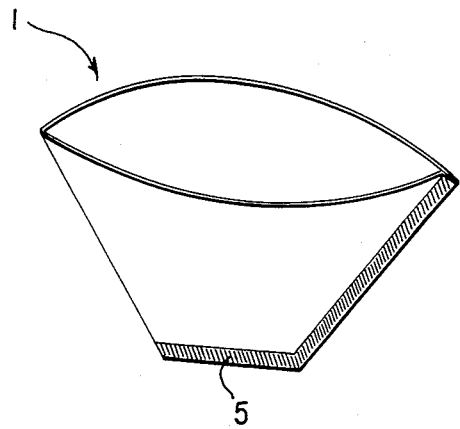
FIG. 1 is a perspective view of a filter paper insert for filtering coffee beverages.

The filter paper insert 1 shown in FIG. 1 has the shape of a frustoconical body and is provided with a continuous seam 5 which has been formed by knurling. This seam is a region of weak points in filter paper insert 1 which are under particularly high stress during the brewing process, also due to the relatively high weight of the wet coffee grounds.

The application of the wet strengthener to seam 5 of filter paper insert 1 can be effected in various ways. For example, it is conceivable to apply it manually. However, it is advisable, since filter paper insert 1 is a mass-produced article, to include application of the wet strengthener within the framework of the existing automatic manufacturing process.

Figure 2:
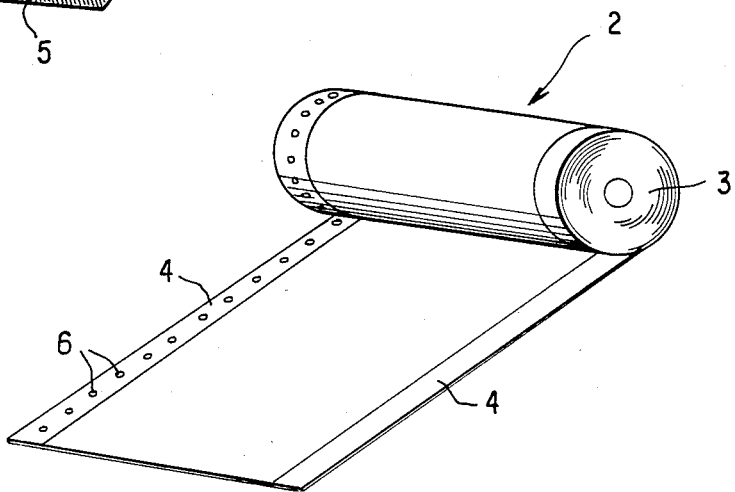
FIG. 2 is a perspective view of a filter paper panel, on a supply roll, which is used in commercial coffee brewing machines.

The filter paper panel, or strip, 2 shown in FIG. 2 includes edge regions 4 via which panel 2 is transported and which have been treated with wet strengthener so as to reinforce the edge regions. One edge region 4 is provided with perforations 6 which can aid in transporting and which can cooperate with a sensing wheel that monitors the quantity of filter paper removed from supply roll 3 so that the need to install a fresh supply roll can be indicated. These perforations 6 constitute an additional weakening of the paper so that an increase of wet strength in edge regions 4 contributes to proper operation during use of the filter panel in a large coffee machine.

Figure 3:
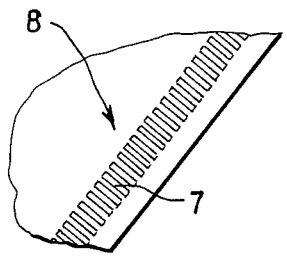
FIG. 3 is a detail view of a portion of the seam formed by knurling the edge of the filter paper insert of FIG. 1.

Knurling 7 formed by relief printing and shown in FIG. 3 indicates that the filter paper fibers are crushed in the seam region 8 of a seam 5, as shown in FIG. 1. By applying wet strengthener to the filter paper insert in seam region 8, the stamping pressure and thus the crushing effect can be reduced.

A typical filter paper employed in the practice of the invention is a sulfate cellulose composition which was mixed, while still in the pulp state, with a wet strengthener that was diluted with water. For example, the sulfate cellulose composition can be a 100% bleached sulfate cellular material of cellulose-based natural fibers. The wet strengthener can be a cross-linked cationic polyalkylenimine, such as polyamide-polyamine-epichlorohydrin resin, dissolved in water. Wet strengtheners of this type are marketed by the German firms Bayer, under the designation "NADAVIN LT", and Hoechst, under the designation "RESAMIN VHW 2604".

According to the prior art, the concentration of wet strengthener can be selected so that after the paper has been placed in sheet form and dried, the proportion of wet strengthener in the paper is about 0.3%, by weight.

When a sheet of this paper is formed into an insert, or filter cone, which can have the form shown in FIG. 1, the seam is formed by application of a high level of pressure, causing the paper in the seam region to become larger in area, and hence thinner. Thus the strength of the paper in the seam region is reduced.

The present invention compensates for this weakening by adding wet strengthener to the or each region which is weakened. This can be done by impregnating the or each weakened region with an aqueous solution of wet strengthener, using a conventional pressure process. Typically, the wet strengthener is applied in the form of an aqueous solution with an industrially customary concentration of 12.5% wet strengthener. In the case of a typical filter having the form shown in FIG. 1, the seam region would have an area of 180 mm$^2$ and would contain an additional 0.03 gram of dry wet strengthener.

The wet strengthener solution can be applied to the or each weakened region at normal room temperature but a heat treatment can be employed to accelerate the strengthening process. Heating can be effected, for example, by the application of hot air or infrared or microwave radiation.

The resulting filter can then have a wet strengthener content of 0.8%, by weight, in the specially treated weakened regions and a content of 0.3%, by weight, in the remainder of the filter. The total content will, therefore, not exceed 0.5%.

If the entire filter were given the higher wet strengthener content, the filter would not be usable because it would no longer be sufficiently liquid permeable. Moreover, the wet strengthener content would then exceed the earlier-mentioned permissible limit.

In the case of a panel as shown in FIG. 2, the above-described impregnation with additional wet strengthener would be performed along both edge regions 4.

It will be understood that the above description of the present invention is susceptible to various modifications, changes and adaptations, and the same are intended to be comprehended within the meaning and range of equivalents of the appended claims.

What is claimed is:

1. In a process for manufacturing articles of filter paper, the process including: effecting mechanical working of a piece of filter paper to form a seam at which two parts of the piece of filter paper are joined together, the mechanical working resulting in the formation of weak points at the seam; and strengthening the paper with the aid of a wet strengthener of cross-linked cationic polyalkylenimines, the improvement wherein said step of strengthening comprises applying the wet strengthener only to the regions of the weak points after said step of effecting mechanical working.

2. Process as defined in claim 1 wherein the wet strengthener is applied in measured doses.

3. Process as defined in claim 1, wherein said step of effecting mechanical working comprises effecting a relief printing before said step of applying the wet strengthener, and further comprising effecting a heat treatment after said step of applying the wet strengthener to harden said strengthener.

* * * * *